(12) United States Patent
Robie (10) Patent No.: US 7,974,966 B2
(45) Date of Patent: Jul. 5, 2011

(54) METHOD AND AN APPARATUS TO DELIVER MESSAGES BETWEEN APPLICATIONS

(75) Inventor: Jonathan Robie, Durham, NC (US)

(73) Assignee: Red Hat, Inc., Raleigh, NC (US)

( * ) Notice: Subject to any disclaimer, the term of this patent is extended or adjusted under 35 U.S.C. 154(b) by 407 days.

(21) Appl. No.: 11/897,607

(22) Filed: Aug. 31, 2007

(65) Prior Publication Data

US 2009/0063418 A1 Mar. 5, 2009

(51) Int. Cl.
*G06F 17/30* (2006.01)
(52) U.S. Cl. ........ 707/713; 707/802
(58) Field of Classification Search ........ 707/802, 707/713
See application file for complete search history.

(56) References Cited

U.S. PATENT DOCUMENTS

| | | | |
|---|---|---|---|
| 6,839,730 B1* | 1/2005 | Ramabhadran | 709/201 |
| 2004/0034639 A1* | 2/2004 | McFadden | 707/10 |
| 2005/0216555 A1* | 9/2005 | English et al. | 709/204 |
| 2005/0267896 A1 | 12/2005 | Goodman et al. | |
| 2006/0007466 A1* | 1/2006 | Ben-Yehuda et al. | 358/1.13 |
| 2006/0031432 A1 | 2/2006 | Patrick et al. | |
| 2007/0121822 A1* | 5/2007 | Carnale et al. | 379/88.14 |
| 2008/0091310 A1* | 4/2008 | Fussell et al. | 701/3 |

OTHER PUBLICATIONS

Robie, J., "An XQuery Servlet for RESTful Data Services", 2006, 13 pages.
Trieloff, C., "Using AMQP, RHM, and Qpid to Solve Some Common Middleware Problems", http://www.redhat.com/promo/summit/2007/includes/sessions/technology_strategies/middlewareproblems.html, 2007.
Boag, S., et al., "XQuery 1.0: An XML Query Language", http://www.w3.org/TR/2007/REC-xquery-20070123/, Jan. 23, 2007, 227 pages.
Trieloff, C., et al., "AMQP Advanced Message Queuing Protocol: Protocol Specification", Version 0.8, Jun. 2006, 58 pages.
Red Hat Messaging, May 8, 2007, http://rhm.et.redhat.com/page/Main_Page, 1-3 pages.
Advanced Message Queuing Protocol (AMQP) Specifications, "Joint Specification Overview", http://www.amqp.org/, © Copyright 2006.
AMQP: OpenApproach, "About AMQP", http://www.amqp.orq/tikiwiki/tiki-index.php?page=OpenApproach, Mar. 15, 2007, 1-3 pages.
AMQP, "AMQP FAQ", http://www.amqp.org/tikiwiki/tiki-view_faq.php?faqId=1, © Copyright 2006, 1-7 pages.
Redhat.com Solutions, "Advance Message Queuing Protocol Specification", "Joint Specification Overview", http://www.redhat.com/solutions/specifications/amqp/, © Copyright 2007, 1-3 pages.
"XQuery", http://en.wikipedia.org/wiki/XQuery, Jul. 18, 2007, 1-6 pages.

(Continued)

*Primary Examiner* — Neveen Abel-Jalil
*Assistant Examiner* — Son T. Hoang
(74) *Attorney, Agent, or Firm* — Lowenstein Sandler PC (57) ABSTRACT

In one embodiment of a computing system, a client supplied binding is received from a client, wherein the client supplied binding includes an XQuery or a script. A predefined binding is stored in a server, wherein said predefined binding includes an XQuery, a script, or a program, allowing the client to select the predefined binding. An exchange receives an Extensible Markup Language (XML) message from a publisher application and sends the XML message to each message queue whose binding matches the XML message.

6 Claims, 5 Drawing Sheets

OTHER PUBLICATIONS

AMQP Specification (XML-derived), www.redhat.com/f/pdf/amqp/amqp_0-9_protocol_deocumentation.pdf, 1-139 pages.

PCT International Search Report and Written Opinion of the International Searching Authority, PCT/US08/10121 filed Aug. 26, 2008, mailed Nov. 10, 2008.

"Advanced Message Queuing Protocol", accessed at: http://en.wikipedia.org/wiki/AMQP on Jan. 20, 2011, last updated Dec. 29, 2010, 7 pages.

"Red Hat Messaging", accessed at: http://rhm.et.redhet.com/wiki/index.php?title=Main_Page&oldid-1412, 3 pages May 8, 2007.

"Microsoft and Hyperion Publish Open XML fo Anaylsis Specification", Apr. 23, 2001, accessed at http://www.microsoft.com/presspass/press/2001/Apr01/04-23HyperionPR.mspx?pf=true, 4 pages.

"Microsoft's Bill Gates Previews New 'HailStorm' Technologies to Usher in New Era of More Consistent, Personalized and User-Centric Experiences", Mar. 19, 2001, accessed at http://www.microsoft.com/presspass/press/2001/mar01/03-19HailstormPR.mspx, 4 pages.

"Open Source Design Bureau: Products", accessed at http://www.imatix.com/products, 1 page. Mar. 15, 2007.

"Open Source Design Bureau: Press Release dated Mar. 15, 2007", accessed at http://www.imatix.com/forum/t-6074/15-mar-2007:openamq-1-2-released, 1 page.

"RabbitMQ—Roadmap", accessed at http://www.rabbitmq.com/roadmap.html, 2 pages. May 8, 2007.

"RabbitMQ—Open Source Enterprise Messaging", accessed at http://www.rabbitmq.com, 1 page. May 8, 2007.

"Microsoft Hailstorm", Jun. 19, 2001, accessed at http://xml.coverpages.org/hailstorm.html, 15 pages.

Richardson, Alexis, "AMQP Business Messaging for Predictable, Scalable, Available SOA", Microsoft Architects Insight Conference 2008, 59 pages.

"Microsoft's HailStorm Unleashed", Mar. 19, 2001, accessed at http://news.cnet.com/2100-1001-254337.html, 5 pages.

"A Quick Introduction to HailStorm", May 14, 2001, accessed at http://msdn.microsoft.com/en-us/library/bb263932(VS.85,printer).aspx, 3 pages.

"Messaging Technology: A Solutions Perspective", Jan. 2008, accessed at http://msdn.microsoft.com/en-us/library/cc168610(printer).aspx, 7 pages.

* cited by examiner

METHOD AND AN APPARATUS TO DELIVER MESSAGES BETWEEN APPLICATIONS

TECHNICAL FIELD

Embodiments of the present invention relate to middleware, and more specifically to delivering messages using middleware.

BACKGROUND

Conventionally, middleware, which may include one or more programs, is used to operatively couple at least two otherwise separate applications. In other words, the middleware may be analogized to be the "glue" between the two applications. For example, some middleware may operatively couple a database system to a web server to allow users of the web server to access the database system. One type of middleware is referred to as messaging middleware, which is used to route messages between applications. A message as used herein broadly refers to communication between applications.

Messaging is a crucial component for enterprise and high-performance computing, Service Oriented Architecture (SOA) deployments, and platform services. Until recently, enterprise-level messaging systems have mostly been proprietary, mutually incompatible, and quite expensive. Some open messaging systems have existed, but until now, they typically do not offer the reliability or performance needed for demanding applications.

In response to the demands for a predictable, high speed, reliable, secure, and scalable messaging system, the Advanced Messaging Queuing Protocol (AMQP) specification was developed to create an open standard for interoperable messaging. AMQP defines both a wire level protocol for messaging (the transport layer) and higher level semantics for messaging (the functional layer).

Currently, AMQP treats all message content as opaque. The existing AMQP approach has advantages in terms of simplicity and efficiency. However, the use of XML content in messaging is increasing, and the current AMQP lacks support for routing based on XML content. Furthermore, the current interfaces are typically not designed for easy integration of XML messages into standard XML application programming interfaces (APIs).

DESCRIPTION OF THE DRAWINGS

The present invention is illustrated by way of example, and not by way of limitation, in the figures of the accompanying drawings and in which.

DETAILED DESCRIPTION

Described herein are some embodiments of a method and an apparatus to deliver messages between applications. As mentioned above, a message as used herein broadly refers to communication between applications. A message may be composed in one or more formats, such as plain text, Extensible Markup Language (XML), etc. Specifically, message having XML content is referred to as an XML message herein. The physical format of an XML message varies; for example, it may be composed of text, which may be identified by Multipurpose Internet Mail Extension (MIME) types including "application/xml," "text/xml," any (MIME type ending with "+xml" (e.g., "application/atom+xml"), or it may be binary XML, or it may be an event stream such as SAX events or StAX events, or it may be a pre-parsed tree such as a Document Object Model (DOM) tree. An application that sends messages is referred to as a publisher application. On the other hand, an application that receives messages is referred to as a consumer application. Note that the publisher application and the consumer application are not mutually exclusive. In some embodiments, messaging middleware includes an exchange and one or more message queues. The exchange is a processing module that accepts messages from the publisher application and routes the messages to the message queues. The message queue stores messages and forwards the messages stored to the consumer application.

In some embodiments, an XML exchange receives an XML message from a publisher application. The XML exchange processes the XML message and routes the XML message to one or more message queues based on content of the XML message and routing provided by a set of consumer applications. The routing determines what messages the consumer applications are interested in. In some embodiments, the routing may be a query written in XQuery (or simply referred to as an XQuery) or a script. A consumer application may specify bindings based on XML content using XQuery. A binding indicates a relationship between a message queue and the XML exchange, and thus, dictates what messages are routed to the message queue from the XML exchange. In some embodiments, message properties and headers are queried by binding them to external XQuery variables. Furthermore, using XQuery, an XML message may be parsed once, and queried multiple times to reduce the overhead of parsing.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1A:
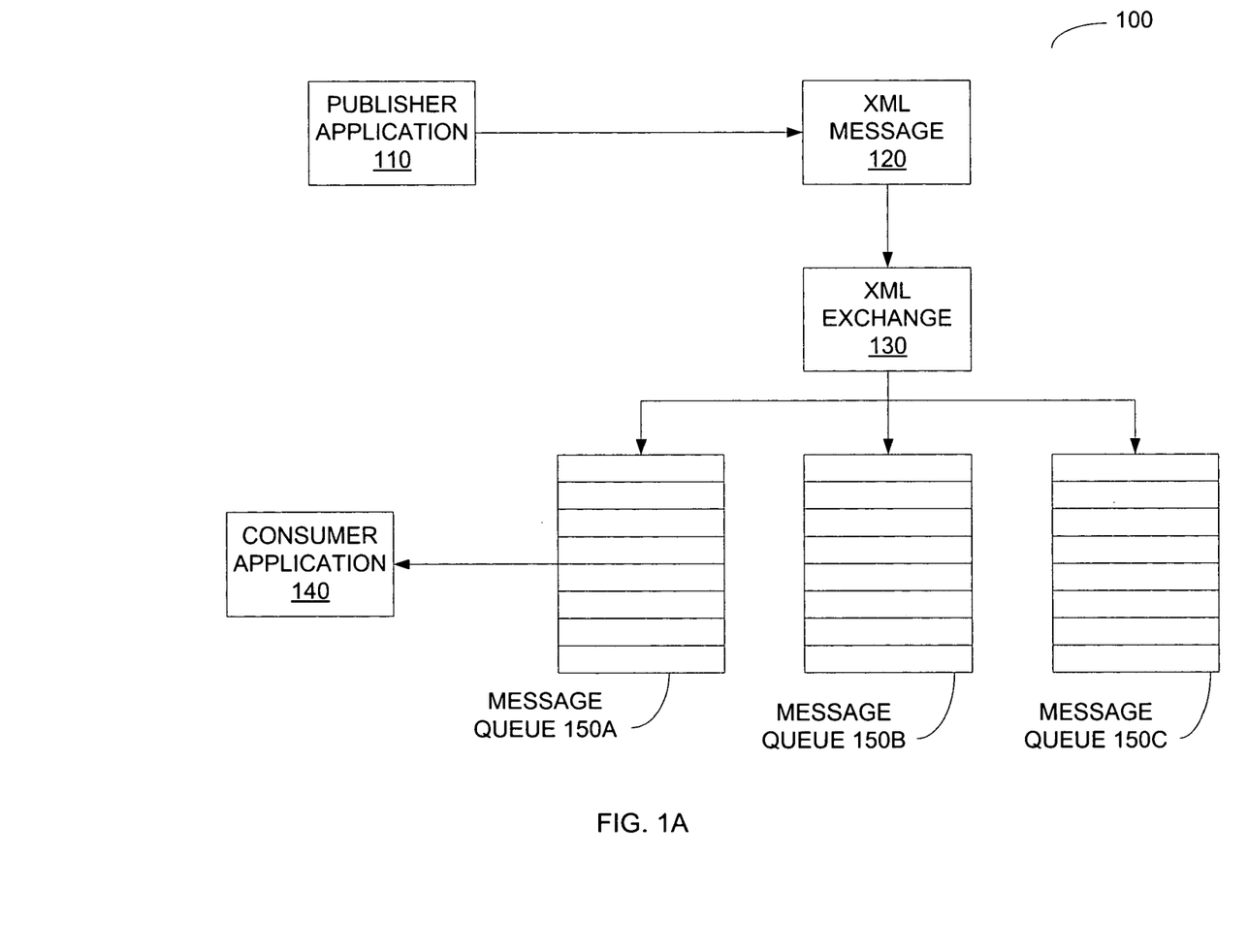
FIG. 1A illustrates one embodiment of a messaging system.

FIG. 1A illustrates one embodiment of a messaging system. The system 100 includes a publisher application 110, an XML exchange 130, a consumer application 140, and a number of message queues 150A-150C. The message queues 150A-150C may be associated with different consumer applications. For example, message queue 150A is associated with the consumer application 140. As mentioned above, the publisher application 110 is an application that sends messages to other applications. Some examples of the publisher application 110 includes electronic mail engine, travel reservation application, merchandise ordering application, etc. On the other hand, the consumer application 140 is an application that receives messages from other applications. Some examples of the consumer application 140 include electronic mail engine, inventory tracking application, various statistics collection applications, etc. Note that publisher applications and consumer applications are not mutually exclusive. That is, one application may be a publisher application in a first transaction and this application may become a consumer application in a second transaction.

The consumer application 140 and the publisher application 110 are communicatively coupled to each other via the XML exchange 130. In some embodiments, the XML exchange 130 runs on a virtual host executable on a server. More details of some embodiments of the XML exchange 130 are discussed below with reference to FIG. 2. To illustrate the operations of the XML exchange 130, one example is discussed in details below. However, variations to the following example may be practiced in other embodiments of the invention.

The publisher application 110 sends an XML message 120 to the XML exchange 130. The XML message 120 may be binary XML or XML text. If the XML message 120 is XML text, then the XML exchange 130 may parse the XML message 120. The XML exchange 130 may also check to determine if the XML message 120 is well-formed. If the XML message 120 is not well-formed, an error is raised. Note that in some embodiments, the XML exchange 130 maty not test all well-formedness conditions if some of the well-formedness conditions are not necessary for processing the XML message 120. In one embodiment, the XML exchange 130 may be configured to perform validation using various techniques, such as using schemas or document type definitions (DTDs) registered in a catalog.

In some embodiments, the XML exchange 130 applies a query associated with message queue 150A to the XML message 120 to determine the content of the XML message 120. Specifically, the query is written to determine if the content of the XML message 120 contains certain information or is related to certain subject matter that the consumer application 140 has requested. The query may be written in a query language designed for querying XML documents, such as XQuery. Note that for efficiency consideration, the XML exchange 130 may prepare the query before using the query to evaluate the XML message 120. In some embodiments, there is a predefined query for each of the message queues 150A-150C. Thus, the XML exchange 130 may create a dataflow graph based on all queries in the XML exchange 130. This may allow the XML message 120 to be tested once against all queries, from all clients. The events that trigger state changes on the dataflow graph may correspond to XQuery expressions, such as steps on a path expression, or to the finer-grained events found in Simple API for XML (SAX). In some embodiments, the events preferably correspond to the steps on a path expression.

Note that the cost of parsing XML messages often dominates the cost of evaluating simple XQuery expressions against the XML messages. Thus, if the XML message 120 is evaluated by only one query, document projection and/or document streaming may be used to improve efficiency. Document projection involves examining a query to determine which parts of the XML message are needed by the query, and then, using this information to limit on the extent of the parsing of the XML message. Document streaming involves using each portion of the XML message to compute the output for which the respective portion is responsible, and then discarding that respective portion of the XML message while processing a subsequent portion of the XML message.

If the XML message 120 is evaluated by more than one query, the XML exchange 130 may use binary XML, which encodes the XML messages in a binary format instead of plain text. Binary XML is a pre-pared form of an XML document, and thus, it only has to be parsed once, and then a query can be applied to the binary representation multiple times. Since parsing often dominates XML processing, using binary XML when there are many queries provides significant saving in time. If the XML message 120 is not in binary XML, the XML exchange 130 may convert the XML message 120 to binary XML when the XML message 120 is first placed in the XML exchange 130.

If the result of the query associated with the message queue 150A is empty, then the XML exchange 130 may conclude that the XML message 120 does not contain the information or subject matter requested by the consumer application 140, and thus, the XML exchange 130 may not route the result of the query to a message queue associated with the consumer application 140, i.e., message queue 150A in the current example. Otherwise, if the Effective Boolean Value of the query is true, then the XML exchange 130 may conclude that the XML message 120 contains the information or subject matter requested by the consumer application 140, and thus, the XML exchange 130 may route the result of the query to message queue 150A. In some embodiments, the XML message 120 is transformed into another format requested by the consumer application 140. For example, the XML exchange 130 constructs a second message from the original message (i.e., the XML message 120) to place on the message queue 150A. The message header of the second message may be substantially identical to the message header of the XML message 120 and the message content of the second message may be the output of the query.

In some embodiments, the relationship between the XML exchange 130 and the message queue 150A is referred to as a binding, which may include the query associated with the message queue 150A. The binding may filter and/or transform the XML message 120. For example, the binding may return the $msg variable if the binding is designed to return the original message. Alternatively, the binding may filter and transform a message in a single query. This allows individual message queues to receive only the data the message queues need, in the format the message queues require. An example of such a binding is shown below:

```
let $hotel := $msg/body/request/hotel
return
    if ($hotel)
        then $hotel
        else ( )
```

Referring back to FIG. 1A, the message queue 150A may bind to the XML exchange 130 using a queue.bind( ) method. The arguments of the queue.bind( ) method may contain the query, which is associated with message queue 150A, written in XQuery. Thus, the query may be simply referred to as an XQuery. The name of the field is "application/xquery" and the value is the text of the query. The binding is evaluated using the XML message 120 as input. The condition of the binding is satisfied if and only if the result of the query is neither an empty sequence nor an error. Alternatively, bindings may be implemented using routing keys, which is generally faster. Routing keys are also bound to variables that are accessible in XQuery bindings, so a binding can be based on both a routing key and the XML content of the XML message 120.

In some embodiments, some external variables are bound before invoking a query. As such, the external variables may be used in the query. For example, $msg may be bound to the XML content of the XML message 120. Each single-valued (a.k.a., singleton value) item in the message headers is bound to a variable with the same name and type as the item. For instance, if the headers contain an item named "sender" with an integer value, the item is bound to an XQuery variable named $sender with the same value and the type XML Schema (xs):integer. Note that the item may have a value of different types in other embodiments, such as xs:string, xs:any Uniform Resource Identifier (URI), xs:untypedAtomic, etc. In some embodiments, sequences and arrays are bound to elements with the same name as the collection type ("sequence" or "array"), with child elements that represent individual items as discussed above.

Note that the message queues 150A-150C provide a store-and-forward feature to the messaging system 100. In other words, messages from the publisher application 110 may be stored in one or more of the message queues 150A-150C until requested for delivery (possibly up to some maximum time limit) before being forwarded to consumer applications (e.g., consumer application 140). Referring back to the above example, the query result from the XML exchange 130 is stored in the message queue 150A, then forwarded to the consumer application 140. In some embodiments, the messages in the message queue 150A are forwarded to the consumer application 140 when the message queue 150A becomes full. Alternatively, the messages in the message queue 150A may be forwarded to the consumer application 140 periodically. In a further embodiment, the messages in the message queue 150A may be forwarded to the consumer application 140 in response to a request from the consumer application 140.

Although there is only one XML exchange 130 shown in FIG. 1A, there may be additional XML exchanges in other embodiments. Furthermore, multiple XML exchanges may be arranged into a series, which is also referred to as exchange chaining, in some embodiments.

Figure 1B:
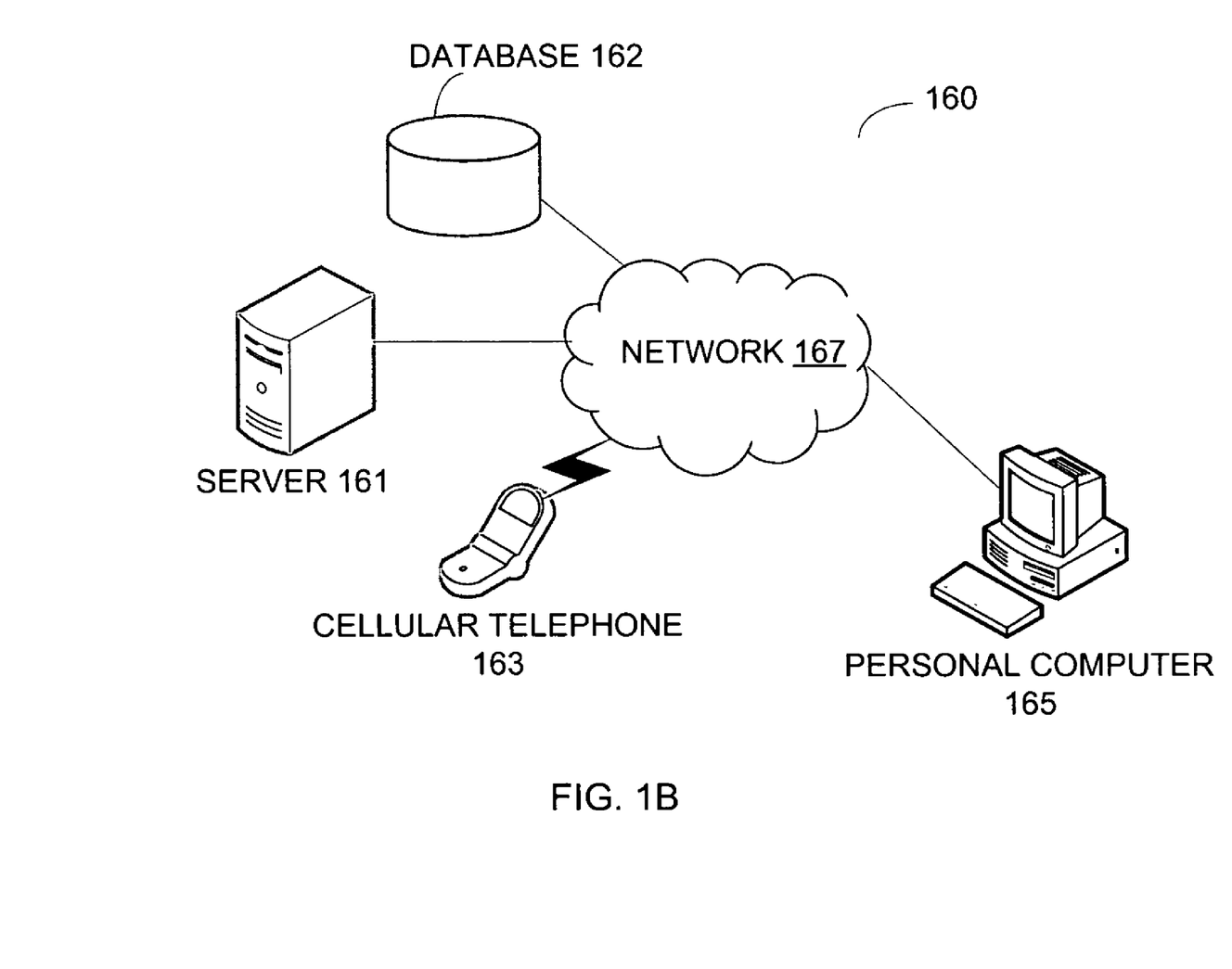
FIG. 1B illustrates one embodiment of a system in which embodiments of the present invention may be implemented.

FIG. 1B illustrates one embodiment of a system in which embodiments of the present invention may be implemented. The system 160 includes a server 161, a database 162, a cellular telephone 163, a personal computer (PC) 165, and a network 167. The server 161, the cellular telephone 163, and the PC 165 are communicatively coupled to the network 167, which may include wireless networks and/or wirelined networks. Furthermore, the network 167 may include different types of network, such as local area network (LAN), personal area network (PAN), wide area network (WAN), etc. The cellular telephone 163 and the PC 165 merely serve as some examples of a client machine, and one should appreciate that other types of client machines may be used in different embodiments, such as personal digital assistants (PDAs), laptop computers, smart phones, special purpose devices (e.g., ordering devices in a point of sale system, merchandise scanning devices, etc.), media players (e.g., MP3 player), etc.

In some embodiments, an XML exchange runs on the server 161. Furthermore, the server 161 may include a storage device to store a number of message queues. Alternatively, the server 161 may store the message queues in a database 162 external to the server 161. Various applications that may run as publisher applications and/or consumer applications may run on the cellular telephone 163 and/or the PC 165. For example, a travel agent application, which acts as a publisher application, may be accessible using the cellular telephone 163 and a consumer application that books flights is executable on the PC 165. A user using the cellular telephone 163 may go online to access the travel agent application in order to place a reservation for a flight. The travel agent application then sends the reservation request to the server 161 in the form of an XML message. The XML exchange running on the server 161 may query the XML message to extract the date and flight preferences from the XML message, which may be put into a second message in a format requested by a consumer application that books flights. The XML exchange may then route the second message to a message queue associated with the consumer application. The second message may be temporarily stored in the message queue before being forwarded to the consumer application running on the PC 165. Alternatively, a publisher application and/or a consumer application may be running on the server 161 with the XML exchange.

Note that any or all of the components and the associated hardware illustrated in FIG. 1B may be used in various embodiments of the system 160. However, it should be appreciated that other configurations of the system 160 may include more or fewer devices than those shown in FIG. 1B.

For example, there may be additional servers and/or client machines coupled to the network 167 than those shown in FIG. 1B.

Figure 2:
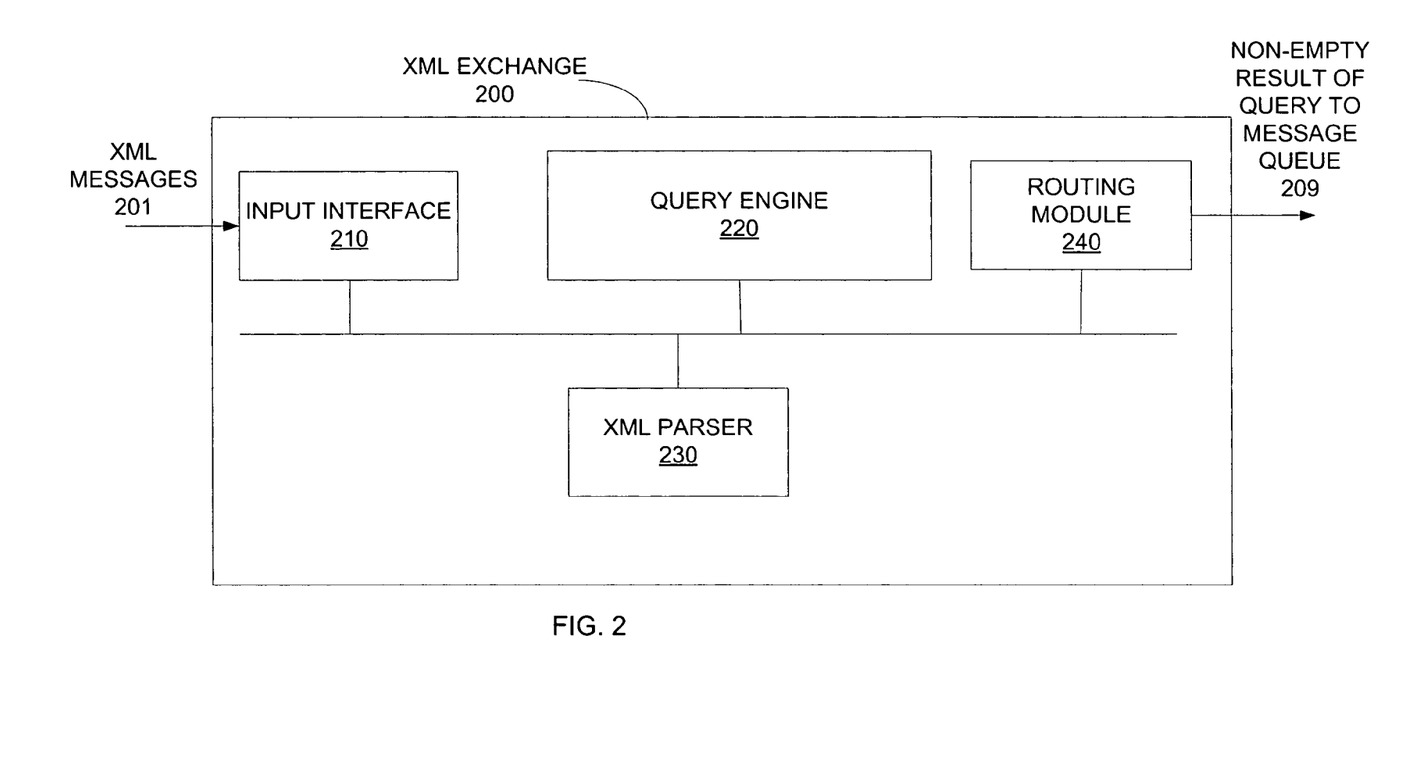
FIG. 2 illustrates a functional block diagram of an Extensible Markup Language (XML) exchange.

FIG. 2 illustrates a functional block diagram of an Extensible Markup Language (XML) exchange. The XML exchange 200 includes an input interface 210, a query engine 220, an XML parser 230, and a routing module 240, which are operatively coupled to each other.

In some embodiments, the input interface 210 receives an XML message 201 from a publisher application (e.g., the publisher application 110 in FIG. 1A). If the XML message 201 is not yet parsed, the XML parser 230 may parse the XML message 201. The parsed XML message is forwarded to the query engine 220, which applies a query to the message. The query is written in an XML query language, such as XQuery. The query is used to determine if the message contains information requested by one or more consumer applications. For instance, if the consumer application is an ordering and inventory tracking application for a toy department of a store, then the query may be written to determine if the message contains any information on orders of toys. If so, the query engine 220 may extracts such information from the message, which is also referred to as the result of the query. Otherwise, application of the query to the message may produce an empty result.

In some embodiments, the query is associated with a message queue. The relationship between the message queue and the XML exchange 200 is referred to as a binding. The query may be part of the binding. If the result of the query is empty, then the routing module 240 does not route the result of the query to the message queue. Otherwise, the routing module 240 routes the result of the query 209 to the message queue.

In some embodiments, the query engine 220 further puts the non-empty result of the query into a particular format requested by the consumer application. This particular format may or may not be in XML.

In some embodiments, a routing, which may include scripts, programs, and/or queries, is installed on the server on which the XML exchange 200 runs. The routing may be associated with a name using an administration API or other similar mechanism, and thus, is also referred to as a named routing. Message properties and headers may also be accessed by the scripts, programs, and/or queries of the routing by binding them to external variables. In some embodiments, the server may have engines built for some query and scripting languages so that the scripts, programs, and/or queries may be preloaded and executed more quickly and scripts written in other languages may be executed on the server using the operating system. Likewise, in some embodiments, scripts, programs, and/or queries for transforming messages into different formats may be installed on the server.

Figure 3:
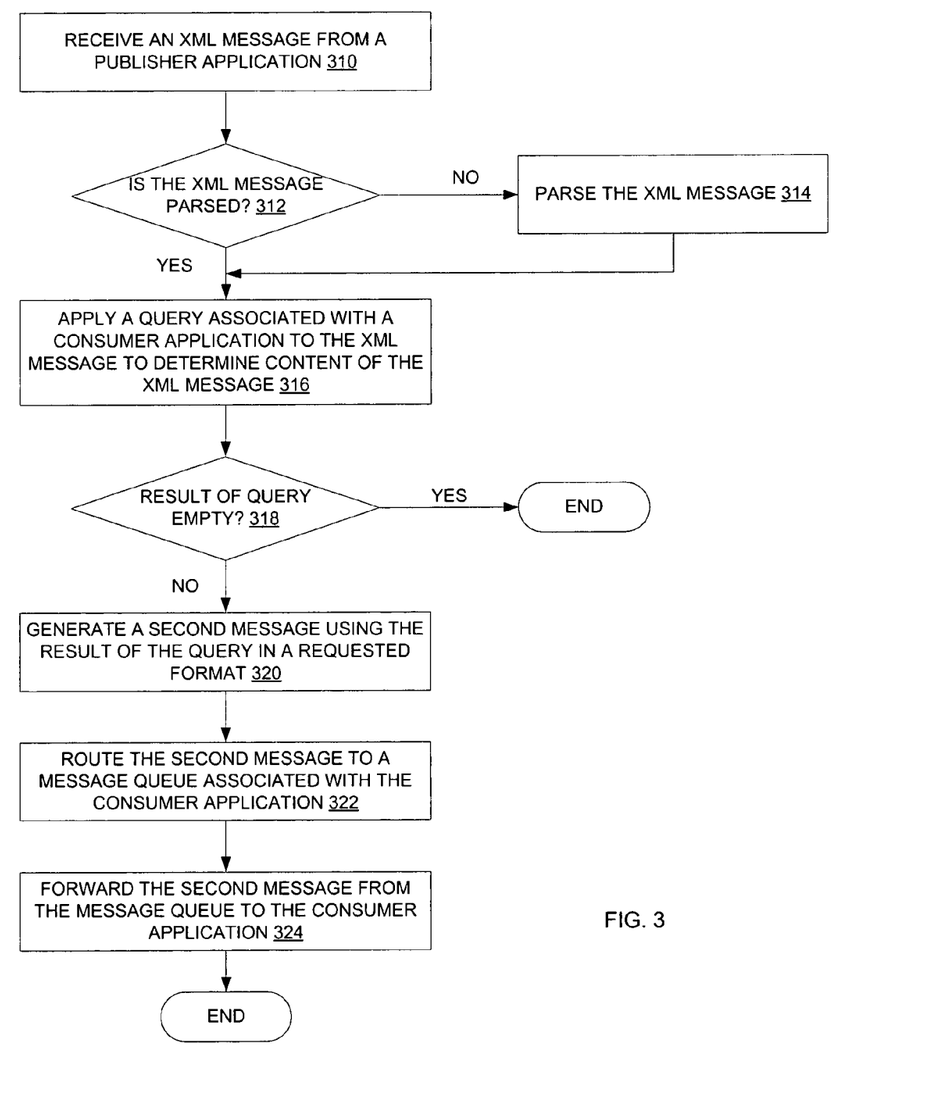
FIG. 3 illustrates a flow diagram of one embodiment of a process to deliver messages.

FIG. 3 illustrates a flow diagram of one embodiment of a process to authenticate a user. The process may be performed by processing logic that may comprise hardware (e.g., circuitry, dedicated logic, programmable logic, microcode, etc.), software (such as instructions run on a processing device), firmware, or a combination thereof. For example, the server 161 in FIG. 1B may perform at least part of the process.

Referring to FIG. 3, processing logic receives an XML message from a publisher application (processing block 310). Then processing logic determines if the XML message has been parsed (processing block 312). If the XML message has not been parsed yet, processing logic parses the XML message (processing block 314) and then transitions into processing block 316. Otherwise, processing logic transitions into processing block 316 from processing block 312. Processing logic applies a query to the XML message to determine the content of the XML message (processing block 316). The query is associated with a consumer application requesting messages containing a particular type of information. The information requested may be extracted by the query if the XML message contains the information. Then processing logic checks if the result of the query is empty (processing block 318). If the result of the query is empty, then the process ends because the XML message does not contain the information requested by the consumer application. Otherwise, the process continues at processing block 320.

Processing logic generates a second message using the result of the query in a format requested by the consumer application (processing block 320). Processing logic routes the second message to a message queue associated with the consumer application (processing block 322). Finally, processing logic forwards the second message from the message queue to the consumer application (processing block 324) and the process ends.

Figure 4:
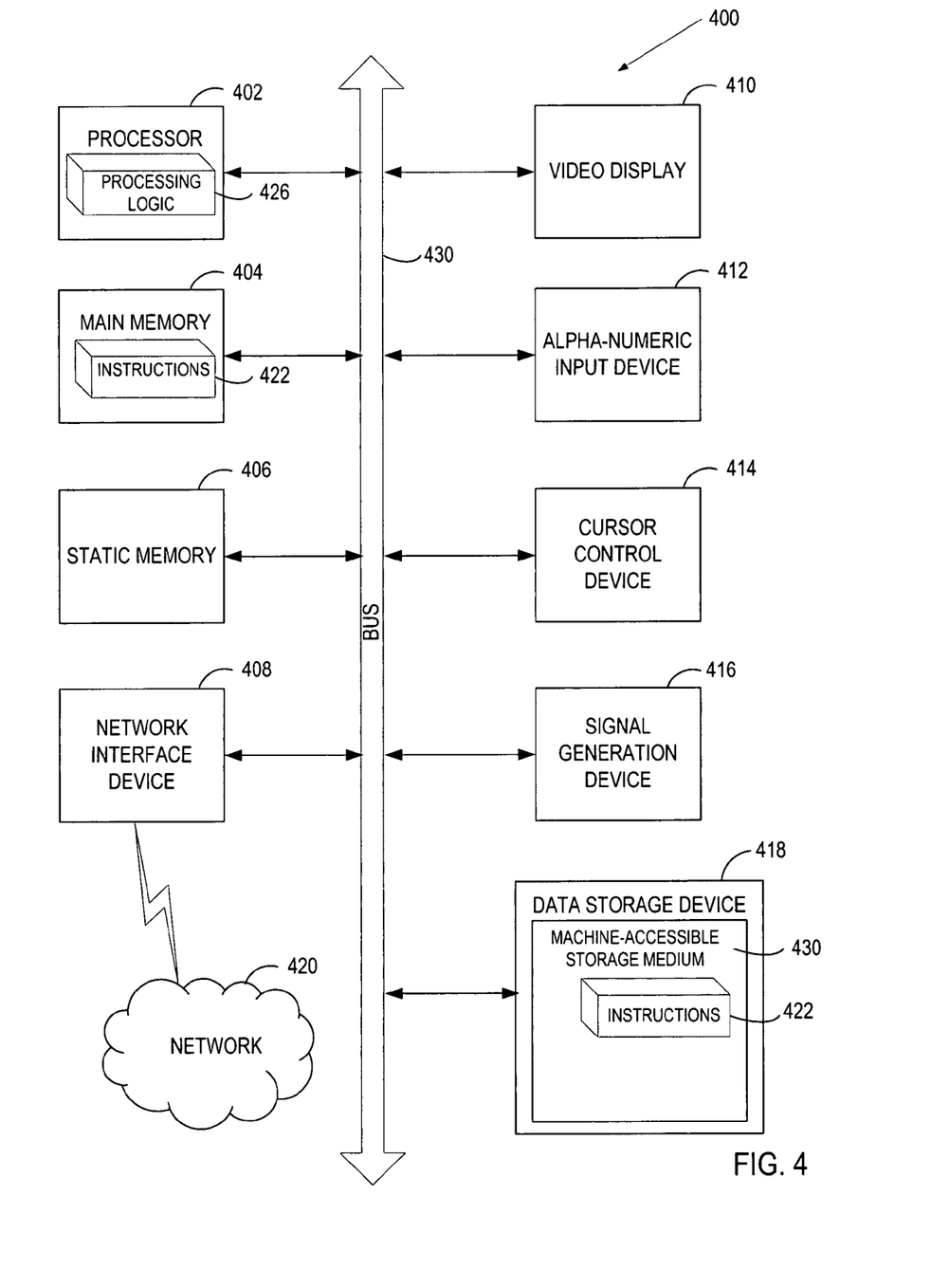
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of a method and an apparatus to deliver messages between applications have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   receiving a client supplied binding from a client, wherein said client supplied binding includes an Extensible Markup Language Query (XQuery) or a script;
   storing a predefined binding in a server, wherein said predefined binding includes an XQuery, a script, or a program;
   allowing the client to select the predefined binding;
   an exchange receiving an Extensible Markup Language (XML) message from a publisher application;
   the exchange sending the XML message to each message queue whose binding matches the XML message; and
   preparing queries using a dataflow graph that represents conditions for all or some subset of the active bindings associated with the client message queues, so that a condition is evaluated only once when it is used in more than one binding, wherein the dataflow graph comprises a plurality of states, and wherein events that trigger state changes on the dataflow graph correspond to XQuery expressions;
   optimizing query processing for routing decisions by evaluating only an Effective Boolean Value of a given binding;
   retaining information required to detect whether a query result belongs to a list comprising:
   an empty sequence,
   a sequence whose first item is a node,
   a singleton value of type XML Schema (xs):boolean or derived from xs:boolean,
   a singleton value of type xs:string, xs:any Uniform Resource Identifier (URI), xs:untypedAtomic, or a type derived from one of these, with length one, and
   a singleton value of a numeric type or derived from a numeric type with value Not A Number (NaN), 0, or a type error if converted to a Boolean value using a standard XQuery definition; and
   eliminating processing required to construct specific query results and structures based on the retained information,
   wherein the Effective Boolean Value represents a value of true or false, the type xs:boolean represents data that contains mathematical concept of true or false, the type xs:string represents data that contains character strings, the type xs:anyURI represents data that contains a URI including one or more web page addresses, and the type xs:untypedAtomic represents data that contains one or more attributes and text values of unvalidated XML.

2. A computer-implemented method comprising:
   receiving a client supplied transform from a client, wherein said client supplied transform includes at least one of a query or a script;
   storing a predefined transform so that it is accessible to an exchange, wherein the predefined transform includes at least one of a query, a script, or a program;
   transforming an Extensible Markup Language (XML) message to a different format based on the client supplied transform or the predefined transform before delivering it to a client message queue;
   preparing queries using a dataflow graph to evaluate conditions used in multiple transformations only once, wherein the dataflow graph comprises a plurality of states, and wherein events that trigger state changes on the dataflow graph correspond to Extensible Markup Language Query (XQuery) expressions;
   optimizing query processing for routing decisions by evaluating only an Effective Boolean Value of a given binding;
   retaining information required to detect whether a query result belongs to a list comprising:
   an empty sequence,
   a sequence whose first item is a node,
   a singleton value of type XML Schema (xs):boolean or derived from xs:boolean,
   a singleton value of type xs:string, xs:any Uniform Resource Identifier (URI), xs:untypedAtomic, or a type derived from one of these, with length one, and
   a singleton value of a numeric type or derived from a numeric type with value Not A Number (NaN), 0, or a type error if converted to a Boolean value using a standard XQuery definition; and
   eliminating processing required to construct specific query results and structures based on the retained information,
   wherein the Effective Boolean Value represents a value of true or false, the type xs:boolean represents data that contains mathematical concept of true or false, the type xs:string represents data that contains character strings, the type xs:anyURI represents data that contains a URI including one or more web page addresses, and the type xs:untypedAtomic represents data that contains one or more attributes and text values of unvalidated XML.

3. A non-transitory machine-readable medium that provides instructions that, when executed by a processor, will cause the processor to perform operations comprising:

receiving a client supplied binding from a client, wherein said client supplied binding includes an Extensible Markup Language Query (XQuery) or a script;
storing a predefined binding in a server, wherein said predefined binding includes an XQuery, a script, or a program,
allowing the client to select the predefined binding;
an exchange receiving an Extensible Markup Language (XML) message from a publisher application;
the exchange sending the XML message to each message queue whose binding matches the XML message;
preparing queries using a dataflow graph that represents conditions for all or some subset of the active bindings associated with the client message queues, so that a condition is evaluated only once when it is used in more than one binding, wherein the dataflow graph comprises a plurality of states, and wherein events that trigger state changes on the dataflow graph correspond to XQuery expressions;
optimizing query processing for routing decisions by evaluating only an Effective Boolean Value of a given binding;
retaining information required to detect whether a query result belongs to a list comprising:
an empty sequence,
a sequence whose first item is a node,
a singleton value of type XML Schema (xs):boolean or derived from xs:boolean,
a singleton value of type xs:string, xs:any Uniform Resource Identifier (URI), xs:untypedAtomic, or a type derived from one of these, with length one, and
a singleton value of a numeric type or derived from a numeric type with value Not A Number (NaN), 0, or a type error if converted to a Boolean value using a standard XQuery definition; and
eliminating processing required to construct specific query results and structures based on the retained information,
wherein the Effective Boolean Value represents a value of true or false, the type xs:boolean represents data that contains mathematical concept of true or false, the type xs:string represents data that contains character strings, the type xs:anyURI represents data that contains a URI including one or more web page addresses, and the type xs:untypedAtomic represents data that contains one or more attributes and text values of unvalidated XML.

4. A non-transitory machine-readable medium that provides instructions that, when executed by a processor, will cause the processor to perform operations comprising:
receiving a client supplied transform from a client, wherein said client supplied transform includes at least one of a query or a script;
storing a predefined transform so that it is accessible to an exchange, wherein the predefined transform includes at least one of a query, a script, or a program;
transforming an Extensible Markup Language (XML) message to a different format based on the client supplied transform or the predefined transform before delivering it to a client message queue;
preparing queries using a dataflow graph to evaluate conditions used in multiple transformations only once, wherein the dataflow graph comprises a plurality of states, and wherein events that trigger state changes on the dataflow graph correspond to Extensible Markup Language Query (XQuery) expressions;
optimizing query processing for routing decisions by evaluating only an Effective Boolean Value of a given binding;
retaining information required to detect whether a query result belongs to a list comprising:
an empty sequence,
a sequence whose first item is a node,
a singleton value of type XML Schema (xs):boolean or derived from xs:boolean,
a singleton value of type xs:string, xs:any Uniform Resource Identifier (URI), xs:untypedAtomic, or a type derived from one of these, with length one, and
a singleton value of a numeric type or derived from a numeric type with value Not A Number (NaN), 0, or a type error if converted to a Boolean value using a standard XQuery definition; and
eliminating processing required to construct specific query results and structures based on the retained information,
wherein the Effective Boolean Value represents a value of true or false, the type xs:boolean represents data that contains mathematical concept of true or false, the type xs:string represents data that contains character strings, the type xs:anyURI represents data that contains a URI including one or more web page addresses, and the type xs:untypedAtomic represents data that contains one or more attributes and text values of unvalidated XML.

5. An apparatus comprising:
an application programming interface (API) and a network protocol to receive a client supplied binding from a client, wherein said client supplied binding includes at least one of an Extensible Markup Language Query (XQuery) or a script;
a storage device to store a predefined routing, wherein the predefined routing includes at least one of a query, a script, or a program;
an exchange to receive an Extensible Markup Language (XML) message from a publisher application and to send the XML message to one or more message queues if bindings of the one or more message queues match the XML message, wherein the exchange is operable to prepare queries using a dataflow graph that represents conditions for all or some subset of the active bindings associated with the client message queues, so that a condition is evaluated only once when it is used in more than one binding, wherein the dataflow graph comprises a plurality of states, and wherein events that trigger state changes on the dataflow graph correspond to XQuery expressions, wherein the exchange further optimizes query processing for routing decisions by evaluating only an Effective Boolean Value of a given binding, retains information required to detect whether a query result belongs to a list, and eliminates processing required to construct specific query results and structures based on the retained information, the list comprising:
an empty sequence,
a sequence whose first item is a node,
a singleton value of type XML Schema (xs):boolean or derived from xs:boolean,
a singleton value of type xs:string, xs:any Uniform Resource Identifier (URI), xs:untypedAtomic, or a type derived from one of these, with length one, and
a singleton value of a numeric type or derived from a numeric type with value Not A Number (NaN), 0, or a type error if converted to a Boolean value using a standard XQuery definition,
wherein the Effective Boolean Value represents a value of true or false, the type xs:boolean represents data that contains mathematical concept of true or false, the type xs:string represents data that contains character strings, the type xs:anyURI represents data that contains a URI including one or more web page addresses, and the type xs:untypedAtomic represents data that contains one or more attributes and text values of unvalidated XML.

6. The apparatus of claim 5, wherein
the API and the network protocol further receive a client supplied transform from the client, wherein said client supplied transform includes at least one of an XQuery or a script; the storage device further stores a predefined transform, wherein said predefined transform includes at least one of an XQuery, a script, or a program, wherein the XML message is transformed to a different format based on the client supplied transform or the predefined transform before delivering it to a client message queue.

* * * * *